US008947490B2

(12) United States Patent
Guerrero

(10) Patent No.: US 8,947,490 B2
(45) Date of Patent: Feb. 3, 2015

(54) METHOD AND APPARATUS FOR VIDEO PROCESSING FOR IMPROVED VIDEO COMPRESSION

(75) Inventor: Rodolfo Vargas Guerrero, Palo Alto, CA (US)

(73) Assignee: Vibare, Inc., Sunnyvale, CA (US)

( * ) Notice: Subject to any disclaimer, the term of this patent is extended or adjusted under 35 U.S.C. 154(b) by 816 days.

(21) Appl. No.: 13/174,288

(22) Filed: Jun. 30, 2011

(65) Prior Publication Data

US 2012/0002000 A1 Jan. 5, 2012

Related U.S. Application Data

(60) Provisional application No. 61/398,767, filed on Jul. 1, 2010.

(51) Int. Cl.
*H04N 7/14* (2006.01)

(52) U.S. Cl.
USPC ..................... 348/14.02; 379/88.03

(58) Field of Classification Search
USPC ............... 379/88.03; 348/14.01, 14.08, 14.02
See application file for complete search history.

(56) References Cited

U.S. PATENT DOCUMENTS

| | | | |
|---|---|---|---|
| 5,898,457 A | 4/1999 | Nagao et al. | |
| 6,600,786 B1 | 7/2003 | Prakash et al. | |
| 7,257,374 B1 * | 8/2007 | Creigh | 455/41.2 |
| 7,412,386 B2 * | 8/2008 | Janke et al. | 704/254 |
| 7,710,450 B2 | 5/2010 | Dhuey et al. | |
| 7,719,577 B2 | 5/2010 | Bleau et al. | |
| 7,768,543 B2 * | 8/2010 | Christiansen | 348/14.08 |
| 2003/0185302 A1 | 10/2003 | Abrams, Jr. | |
| 2005/0018927 A1 | 1/2005 | Manabe | |
| 2006/0164533 A1 | 7/2006 | Hsieh et al. | |
| 2007/0188597 A1 * | 8/2007 | Kenoyer | 348/14.08 |
| 2007/0206944 A1 | 9/2007 | Ieda | |
| 2009/0033778 A1 | 2/2009 | Bleau et al. | |

FOREIGN PATENT DOCUMENTS

WO      2012/003483 A2      1/2012

OTHER PUBLICATIONS

International Preliminary Report on Patentability for International Application No. PCT/US2011/042862 issued Jan. 8, 2013, 7 pages.

* cited by examiner

*Primary Examiner* — Olisa Anwah
(74) *Attorney, Agent, or Firm* — Kilpatrick Townsend & Stockton LLP

(57) ABSTRACT

Systems, apparatuses, and methods are provided for processing video. In one method, analog image information is acquired over an exposure period, and digital image information is generated from the analog image information at a frame period where the exposure period is greater than the frame period. In another method, stored characteristic information such as images of parties are compared to a received characteristic information. If there is a match, a communication link is established between the parties.

13 Claims, 15 Drawing Sheets

METHOD AND APPARATUS FOR VIDEO PROCESSING FOR IMPROVED VIDEO COMPRESSION

CROSS-REFERENCES TO RELATED APPLICATIONS

The present application claims the benefit under 35 USC §119(e) of U.S. Provisional Application No. 61/398,767 filed on Jul. 1, 2010, the full disclosure of which is incorporated herein by reference in its entirety for all purposes.

BACKGROUND

Embodiments of the present invention generally relate to video processing and, more particularly, to processing and encoding that improve on design constraints such as reducing the bandwidth required for video compression, and to utilizing video processing techniques to manage communication links between multiple parties.

With the migration from analog to digital video (MPEG and follow on standards), there has been a continuous effort to reduce the bit rate required for a given picture quality level. As high definition (HD) video over the Internet has become more commonplace, the need for improved (e.g., lower bit rate) video encoding systems has risen. Although ATSC (broadcast video/off-air) has ample bandwidth available (approximately 19 Mbps), as do some storage media such as Blu-Ray disks, IP-network based video delivery systems such as the Internet or corporate local area networks (LANs) are much more bandwidth constrained. Video over wireless/mobile networks such as GSM, 3G, 4G, and WiMax are even more bandwidth constrained. Video over wide area networks (WANs) is also limited by the end-to-end system latency as is demonstrated during a live long distance news program interview.

Much work has been done to date to improve the performance of video compression systems. This includes improved compression tools, algorithms and coding standards such as MPEG4 AVC, as well as improved video pre-processing techniques. There are many types of video pre-processing techniques being used today. Some focus on improving visual quality such as improved de-interlacing, better scaling, blur reduction, deblocking, etc., while others focus on bit rate reduction such as filtering (at the potential expense of video quality). In general there are three types of video filtering in use today—spatial filtering, spectral filtering and temporal filtering. There are a number of variants of each of these, for example, motion compensated temporal filtering. A common objective of these is to reduce the picture complexity (i.e., make the pictures easier to encode) while minimizing the visible artifacts.

Despite these advances, today's video conferencing systems typically require a bandwidth in excess of 1 Mbps to deliver an acceptable level of HD video quality and have excessive latency and temporal video artifacts.

Further, various modern computer software applications facilitate video communication links between multiple participants. For example, Cisco Systems, Inc. of San Jose, Calif., distributes Webex, a software application that includes functionality for one or two-way video conferencing. Such software also provides functionality for scheduling video conferences, where after a video conference is scheduled, parties are notified as to what they need to do to participate in the conference.

While providing video communication links between multiple participants, today's software applications are burdensome to schedule meetings with, the activation and deactivation of a participants video capturing device is tedious and manual, and there is no association between video quality and an importance of the participants.

BRIEF SUMMARY

Embodiments of the present invention overcome some or all of the aforementioned deficiencies in the related art. According to one embodiment, a method is provided for capturing images. The images may be captured for subsequent encoding into a video stream. In capturing the images, analog images are first acquired, where each analog image is acquired over an exposure period. Digital images are thereafter generated from the analog images. The digital images are generated at a frame rate, where frame rate is the inverse of a frame period. The digital images are generated from the analog images such that the exposure period is greater than the frame period. In doing so, an analog image accumulates a picture over multiple system frame times, resulting in a naturally blurred motion. Such an image may be efficiently encoded and communicated.

According to another embodiment, a method is provided for capturing images via a capture device. The method includes adjusting an exposure period of the capture device so as to expand a dynamic range of the captured image. This may include acquiring an image and determining the luminosity characteristics (e.g., luminosity values from 50 to 100 out of a total range from 0 to 255) of the image. The capture device may then be adjusted so as to shift the luminosity characteristics of the image to a minimum luminosity (e.g., so that the image is shifted to between 0 and 50). The exposure period of the capture device is then increased so as to extend the dynamic range of the image (e.g., so that the image luminosity characteristics are stretched over the range 0 to 255). The exposure period is then maintained for the capturing and processing of subsequent images. Such a process may advantageously increase image quality.

According to another embodiment, a method of capturing images is provided. The method includes adjusting a capture device such that a dominant luminosity value of captured images is maintained at a reference luminosity value. This may include determining the luminosity characteristics of a reference image (e.g., luminosity values from 50 to 100), and identifying a dominant luminosity value (e.g., luminosity value 85). As subsequent images are acquired, the dominant luminosity value of the subsequent images may be identified (e.g., luminosity value 92) and the luminosity characteristics shifted (by, e.g., changing an aperture of the capture device) such that the dominant luminosity value of the subsequent images (e.g., 92) is shifted to the dominant luminosity value of the reference image (e.g., 85).

According to another embodiment, a method is provided for communicating a video signal. The method includes filtering noise out of the image at the image capturing device. For example, a video camera may include an encoder that filters images as they are encoded. The filtered signal is then sent to receiver for subsequent decoding and display. The receiver may decode the image and, at the same time as decoding the image, add random noise to the image. The amount of random noise may be associated with the bit rate at which the video was originally encoded. By adding such noise to the decoded image, the picture quality of the decoded image may be improved.

According to another embodiment, a method is provided for communicating a video signal. The method includes spatially separating an image into multiple portions. For example, the image may be separated into horizontal bands.

The horizontal bands may then be individually encoded and transmitted to a receiver rather than encoding and transmitting the entire image. The receiver may then decode and display received portions as they are received. By encoding and transmitting only portions of the image at a time, the size of key frames may be reduced, thereby reducing video latency, and by displaying portions as soon as they arrive, video latency may be further reduced.

According to yet another embodiment, a video communication between two parties can be automatically initiated using facial recognition. For example, two parties may schedule a video conference. Although they may receive email or other reminders about the meeting, there is no automated connection. In this embodiment, when one of the parties is positioned within the view of a video camera, the party's image may be recognized and a video communication link thereafter established with the other party.

Various other embodiments of the present invention are described herein. Some of them are directed to the capturing and processing of video signals, and some may be particularly well suited for the video processing of "continuous video streams" in which there are no drastic scene changes. For example, where the input video is from a single camera sensor input. This contrasts with broadcast video and digital cinema in which separate video scenes are spliced together resulting in occasional abrupt scene changes. Continuous video streams may be generated from cameras in video conferencing, video telephony, mobile video, telepresence and other applications in which the video stream is captured directly off of an image sensor.

For a fuller understanding of the nature and advantages of embodiments of the present invention, reference should be made to the ensuing detailed description and accompanying drawings. Other aspects, objects and advantages of the invention will be apparent from the drawings and detailed description that follows. However, the scope of the invention will be fully apparent from the recitations of the claims.

BRIEF DESCRIPTION OF THE DRAWINGS

A further understanding of the nature and advantages of the invention may be realized by reference to the remaining portions of the specification and the drawings, presented below.

DETAILED DESCRIPTION

Embodiments of the present invention provide systems, apparatuses, and methods for processing and encoding video, and for utilizing video processing techniques to manage communication links between multiple parties.

A Communication System

Figure 1:
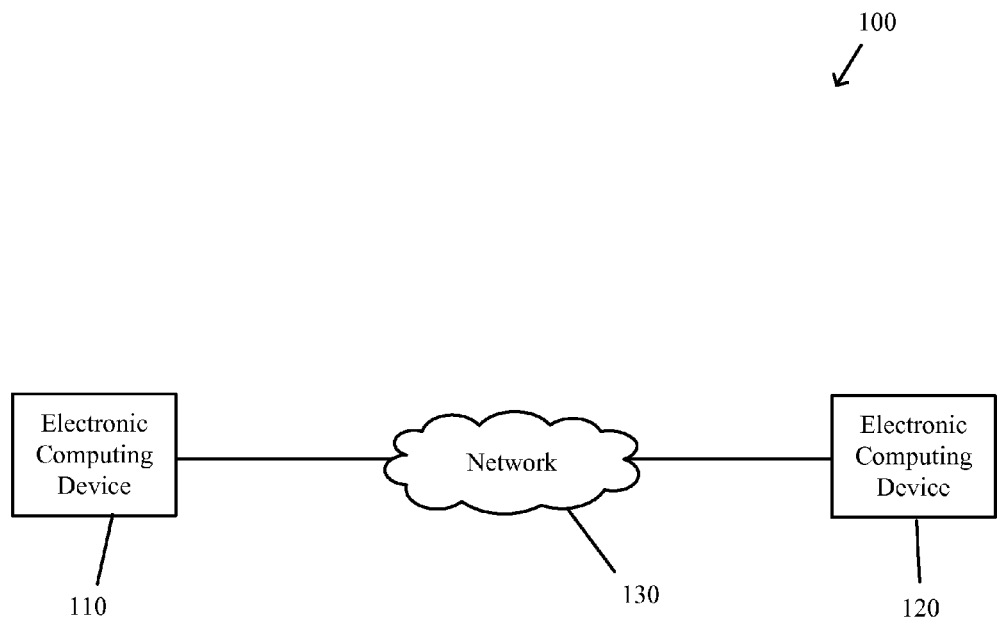
FIG. 1 depicts a high level diagram of a communication system.

FIG. 1 depicts a high level diagram of a communication system 100. The communication system includes a first electronic computing device 110 and a second electronic computing device 120 coupled to each other via a network 130. In some embodiments, additional computing devices may be provided and coupled via network 130. For example, additional computing devices could be coupled to computing device 110 via network 130. In some embodiments, additional networks may be provided. For example, additional computing devices may be coupled to at least one of computing device 110 and computing device 120 via an additional network.

The first and second electronic computing devices may be any suitable electronic device for capturing and transmitting video, and/or receiving and displaying captured video. They may also be suitable for capturing and transmitting audio, and/or receiving and outputting captured audio. The captured and/or displayed video may be two dimensional video and/or three dimensional video. For example, the electronic computing devices may be desktop based-computers, laptops, netbooks, PDAs, mobile telephones, smart phones, tablets, IP phones, etc. For video capturing device capabilities, the electronic computing devices may include or be coupled to suitable elements for capturing video. For example, they may include or be electronically coupled to web cameras, digital cameras, video cameras, etc. Where the video capturing elements are external to other processing elements, the video capturing elements may communicate with the other processing elements via any suitable communication mechanism, such as USB, WiFi, Bluetooth, etc.

The first and second electronic computing devices may include or be electronically coupled with any suitable interface element so that the electronic computing devices may establish a communication link between one another. The communication link may be established using any suitable communication protocol. For example, it may be established using one or more of TCP/IP, UDP, ISDN, Ethernet, etc. In some cases, the communication link may be a wireless communication link utilizing any suitable wireless communication protocol such as Bluetooth, IEEE 802.11, GSM, 3G, 4G, WiMax, etc.

Network 130 may be any suitable network for facilitating a communication link, either directly or indirectly, between electronic computing devices. For example, network 130 may be a LAN, WAN, an intranet, the Internet, etc, or a combination of one or more of these, and may use any suitable networking hardware and/or software, such as DS3 leased lines, T1 lines, etc. In some embodiments, the first and second electronic computing devices are electronically coupled via more than one communication link. For example, via multiple wireless and/or wired communication links, using one or more communication standards.

In some embodiments, communication system 100 may be used to perform video conferencing between rooms or buildings within a single enterprise. These buildings may be co-located, located within a city, a metroplex, located across the country, or located in other countries. In this environment the first and second electronic computing devices are managed within a single enterprise and the video streams travel across the corporate LAN/MAN/WAN, although they may traverse leased lines supplied by service providers.

In many traditional video conferencing systems the bandwidth required is large enough that a dedicated network (typically on the corporate a high-speed LAN/WAN) is required to ensure consistent video quality. Even for standard definition streams most corporations use dedicated video class WAN connections such as fractional T1 or ISDN for their video conferencing services in parallel with their data networks. This approach has severe challenges, cost and scaling limitations. The video conferencing network is configured and managed by the corporate IT department (or their contractors) who sets the network policies for security, quality of service, etc. Although the bandwidth available for this environment may be greater than the bandwidth available from the corporate Internet connection, it is seldom adequate to provide sufficient bandwidth for many simultaneous high definition video calls (each requiring a megabit or more of bandwidth). Corporate IT departments fear the excessive bandwidth required by traditional video conferencing systems will negatively affect other network services. Because existing technology requires such high bandwidth, most enterprises limit intra-company video calls to specific video conferencing capable conference rooms, or, if video conferencing is available on desktops, limit the resolution to less than high definition and limit usage to only the most senior executives.

In some embodiments, communication system 100 may utilize the public Internet to stream video to an electronic computing device. For example, this may be for video telephony or video surveillance over the Internet. In such a system there is no single management system responsible for all of the systems in the network. Rather, end points are managed by different enterprises with unique networking capabilities which are different than that of the Internet. For transmissions over the internet, there is no quality of service architecture in place to ensure consistent delivery of video packets in a timely manner. Accordingly, the need to provide resiliency to data loss and delay is significantly greater. Further, Internet bandwidth is often significantly lower than that of an enterprise's intranet. Accordingly, the need to reduce bandwidth requirements is significantly greater.

An Electronic Computing Device or Video Capturing Device

Figure 2:
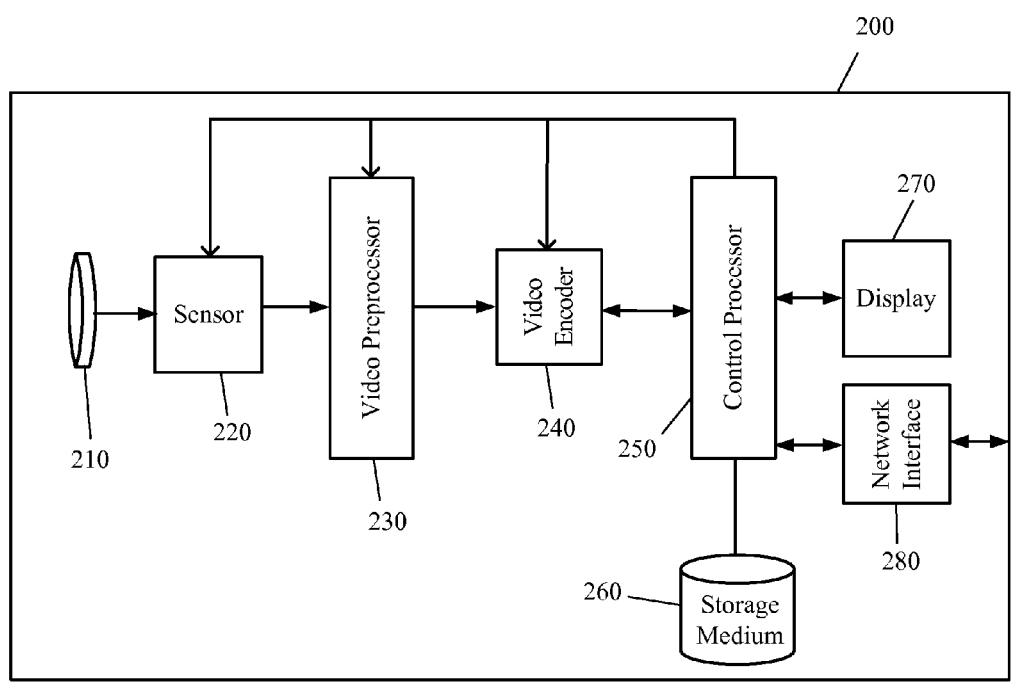
FIG. 2 shows a simplified block diagram of an electronic computing (or video capturing) device.

FIG. 2 shows a simplified block diagram of an electronic computing (or video capturing) device 200. Electronic computing device 200 may be one of first electronic computing device 110 and second electronic computing device 120. Electronic computing device 200 includes various elements for capturing video and, in some embodiments, transmitting the captured video and/or receiving and displaying captured video. In one embodiment, electronic computing device 200 includes a camera lens 210, a video camera sensor 220, a video preprocessor 230, a video encoder 240, a control processor 250, a non-transitory computer-readable storage medium 260, a display device 270, and a network interface 280.

Lens 210 is any suitable lens for directing light onto sensor 220, such as an aspheric lens, a pinhole lens, a closeup lens, a wide angle lens, a fixed lens, etc. Lens 210 functions to direct light, or images, onto sensor 220 such that the light representing an image impinges sensor 220. Sensor 220 may be any suitable sensor for capturing light representing an image. For example, sensor 220 may be a charge-couple device (CCD), CMOS (complementary metal-oxide-semiconductor) active pixel sensor, etc. Sensor 220 may include some or all of the circuitry and/or software typically associated with CCD devices and CMOS active pixel sensors.

Video preprocessor 230 is any processing device operable to read image data from sensor 220 and process the read image data. Video preprocessor 230 may perform various types of preprocessing on the read image data, such as de-interlacing, scaling, blur reduction, deblocking, filtering, etc. Video processor 230 may then pass the preprocessed image data to video encoder 240. In some embodiments, video preprocessor 230 may also be operable to control one or more configurations of the electronic computing device 200, such as the aperture, shutter speed, and/or frame rate.

Video encoder 240 is operable to encode the image data from video preprocessor 230. Video encoder 240 may also perform additional or alternative functions, such as video compression, video filtering, etc. The images captured and encoded by video encoder may be in any suitable format and color space, such as an 8, 10, or 12-bit video format, and a YUV, YCbCr, or RGB video space. The images captured may be encoded and compressed using any suitable format, such as H.264 AVC, MPEG4, MPEG2, or H.263, at any suitable resolution, such as CGA, VGA, XGA, HD 720, HD 1080, etc.

Control processor 250 is operable to control various elements of electronic computing device 200, such as sensor 220, video preprocessor 230, and video encoder 240. For example, control processor 250 may function to determine shutter speeds, frame rates, aperture settings, etc. In doing so, control processor 250 may utilize various types of information acquired from various sources, such as information stored in storage medium 260, information obtained via network interface 280, information acquired from other elements of electronic computing device 200, etc. Control processor 250 may also be operable to process the video data received from video encoder 240 for communication over network 130 via network interface 280. For example, control processor 250 may encapsulate the encoded video data into IP packets for transmission through network interface 280. In one embodiment, control processor 250 is operable to decode video data received via network interface 280 for display on display device 270.

Storage medium 260 may be any suitable tangible non-transitory computer readable medium, such as a random access memory (RAM), a read only memory (ROM), a magnetic medium such as a hard-drive or a floppy disk, a Flash memory device or SSD, or an optical medium such as a CD-ROM. Storage medium 260 may store software code for performing any of the functions described in this application, and may be executed by any suitable processor such as video preprocessor 230 or control processor 250. The software code may be stored in any suitable language, such as Java, Javascript, HTML, C, C++ or Perl using, for example, conventional or object-oriented techniques. The software code may be stored as a series of instructions or commands.

Display device 270 may be any suitable display device, such as a light-emitting diode (LED) display, an organic light-emitting diode (OLED) display, an electroluminescent display (ELD), a plasma display panel (PDP), a liquid crystal display (LCD), etc. Display device 270 may be a 3-D display, such as a swept-volume display, a varifocal mirror display, an emissive volume display, etc. Display device 270 may be operable to display images and/or video captured by sensor 220, and/or display images and/or video received from other electronic computing devices via network interface 280.

Network interface 280 is any suitable interfacing element operable to enable communication between electronic computing device 200 and other electronic computing devices. For example, network interface 280 may include the necessary hardware and/or software to communicate via TCP/IP, UDP, IDSN, Ethernet, Bluetooth, IEEE 802.11, GSM, 3G, 4G, WiMax, etc.

In one embodiment, electronic computing device 200 includes a plurality of video encoders 240. Each video encoder 240 may function to simultaneously generate video streams having unique formats and/or bit rates. In some cases, multiple video encoders may generate video streams in the same format and/or bit rate. By providing a plurality of video encoders 240, a plurality of video streams can be simultaneously generated and subsequently output for transmission via network interface 280. In some embodiments, the format and/or bit rate may be preprogrammed into storage medium 260. In other embodiments, electronic computing device 200 may receive information indicating a desired format and/or bit rate from another device. A video encoder 240 may then be configured to generate a video stream in the desired format and/or bit rate, and communicate the video stream to the other device. For example, electronic device 200 may receive information identifying a desired format and/or bit rate, as well as an identifier identifying the requesting device. A video encoder 240 may then be configured to process the information received from video preprocessor 230 so as to generate a video stream in the desired format and/or bit rate. The generated video stream may then be communicated to the requesting device using the identifier identifying the requesting device.

By providing a plurality of video encoders 240 within electronic device 200, each operable to generate video streams in the same or unique format and/or bit rate, the need for a recipient device to transcode a communicated video stream from one format or bit rate to another is obviated. Moreover, a redundancy is provided within electronic device 200 so as to provide alternative video encoders in the event one or more video encoders fail to operate.

Electronic computing device 200 need not include all of the elements illustrated in FIG. 2. In some embodiments, some elements are not provided at all. In other embodiments, some elements may be provided external to but in communication with computing device 200. For example, electronic computing device 200 may not include display device 270. For a further example, electronic computing device 200 may not include sensor 220, but rather may be electrically coupled to an external sensor 220. For another example, computing device 200 may not include network interface 280. Rather, encoded video may simply be stored on, e.g., storage medium 260. For yet another example, a single processor (or multiple processors) may perform the functions of the video preprocessor 230, video encoder 240, and/or control processor 250.

Electronic computing device 200 may include additional elements as well. For example, in some technologies, a mechanical shutter is required for image sensors. In such a case, electronic computing device 200 may include a mechanical shutter for selectively exposing sensor 220 to impinging light. The mechanical shutter may be controlled by any suitable element, such as video preprocessor 230 and/or control processor 250.

A Method of Capturing Motion

Figure 3:
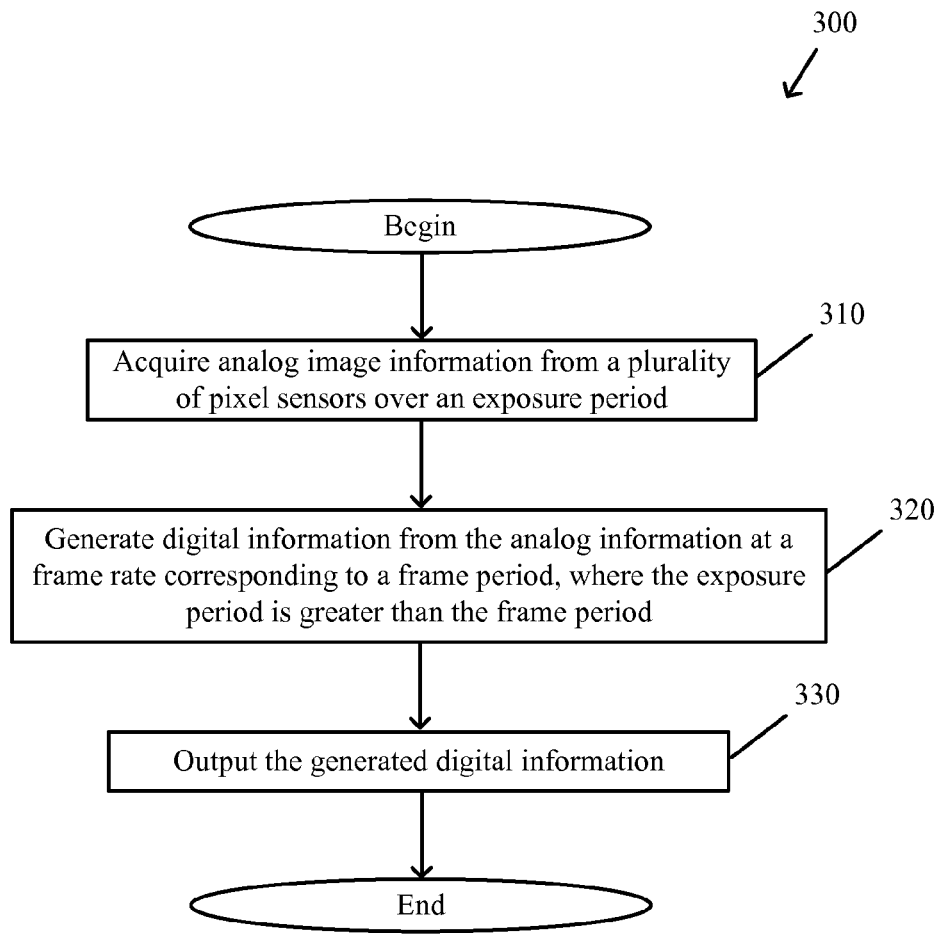
FIG. 3 illustrates a method of capturing motion on a sensor by adjusting the exposure time of the sensor relative to the system frame rate.

FIG. 3 illustrates a method 300 of capturing motion on sensor 220 by adjusting the exposure time of sensor 220 relative to the system frame rate. The aperture may be set to a fixed or dynamic setting. This approach allows the sensor to accumulate the picture over multiple system frame times, resulting in a naturally blurred motion similar to the experience of the human eye observing a fast moving object. This allows a single picture to contain temporal visual information and smoothed motion objects prior to being forwarded to the encoder for compression. This contrasts with the capturing of distinct pictures at the nominal system frame rate (e.g., 60 fps, 30 fps, etc.) that often results in noticeable jerkiness (motion artifacts), particularly at lower bit rates. By accumulating a picture over multiple system frames, dropped frames are much less noticeable (dropped frames are one of the most critical artifacts on video conferencing). Further, as the encoder may compress smooth-edge objects rather than high-detailed edge objects, a higher compression rate may be achieved. Moreover, this also has the effect of averaging (i.e., reducing) the random noise present in the image, particularly for stationary objects.

In step 310, analog image information is acquired. Sensor 220 may acquire the analog image information from a plurality of pixel sensors located in sensor 220. The analog image information for each pixel sensor represents an amount of light impinging upon the pixel sensor over an exposure period. Depending on the type of pixel sensors used, the exposure period may be determined via activation of a mechanical shutter or operation of an electrical shutter. Accordingly, the exposure period may be adjusted by adjusting the shutter speed. An exposure rate is the inverse of the exposure period.

In step 320, digital image information is generated from the analog information at a frame rate. The digital image information may be generated using circuitry within sensor 220, video preprocessor 230, or elsewhere. The frame rate may be considered as the rate at which analog images are converted into digital images and communicated as digital images. A frame period is the inverse of the frame rate.

The exposure period is set greater than the frame period. In other words, the exposure rate is set below the frame rate. For example, the exposure rate may be set to 18 frames per second (fps) with a corresponding reduction in the shutter/capture interval, while the frame rate may set at 30 fps. For another example, the exposure period may be an integer multiple of the frame period. For yet another example, the frame rate may be equal to 30 or 60 frames per second, and the exposure period may be equal to one of $\frac{1}{5}$, $\frac{1}{10}$, $\frac{1}{15}$, $\frac{1}{18}$, $\frac{1}{20}$, or $\frac{1}{25}$ of a second.

Video preprocessor 230 or control processor 250 may instruct encoder 240 to repeat pictures randomly in order to generate an encoded picture stream at a higher frame rate than the exposure rate. For example, control processor 250 may instruct encoder 240 to generate two digital images from a single analog image. As a result of increasing an exposure period relative to the frame rate, an increase amount of motion is captured by sensor 220. The increased motion is often easier to compress within, e.g., an I-frame (Intra-frame), and the skipped analog pictures consume virtually zero bandwidth. Further, if a frame (i.e., an encoded digital image) has to be dropped because it is too large to be buffered or transmitted or because video encoder 240 didn't have enough time to process it, the video frame can be dropped without the penalty of becoming a temporal artifact. The resulting video stream has relatively smooth motion with little of the usual jerkiness of motion artifacts typical of low-bit-rate encoding of high-motion sequences. The human vision system naturally blurs high motion together, so processing as described herein results in a more pleasing visual experience compared to other methods for reducing bit rate in high motion scenes.

In step 330, the generated digital image information is output in a form that can be encoded by video encoder 240. For example, the digital image information may be output in serial or parallel bit streams.

In one embodiment, for a given bit rate, control processor 250 may determine or set at least one of the optimal shutter speed, frame rate, and aperture setting. It determines this automatically without any user input based on maximum allowed bit rate, lens/sensor utilized, picture format, light conditions, encoding performance and network speed. For example, information such as maximum allowed bit rate, lens/sensor utilized, picture format, light conditions, encoding performance and network speed may be stored in storage medium 260 or determined by control processor 250 by sending requests to elements of electronic device 200 and/or network 130. For each bit rate, such information may be mapped to operating parameters, such as shutter speed, frame rate, and/or aperture setting. Accordingly, control processor 250 may first determine the bit rate at which the digital image information is to be encoded and then, using the mapping, automatically determine at least one of the shutter speed, frame rate, and aperture setting.

In another embodiment, control processor 250 may determine or set at least one of a frame rate, shutter speed, and aperture setting based on an identified bit rate. The bit rate may be identified based on, e.g., network properties, image motion, and/or pipeline conditions. The determinations may be done dynamically and progressively so as to advantageously minimize the potential of unwanted "sudden changes." For example, control processor 250 may adjust the frame rate based on the identified bit rate. Control processor 250 may then adjust the shutter speed based on the frame rate, and then adjust the aperture setting based on the shutter speed.

Figure 4A:
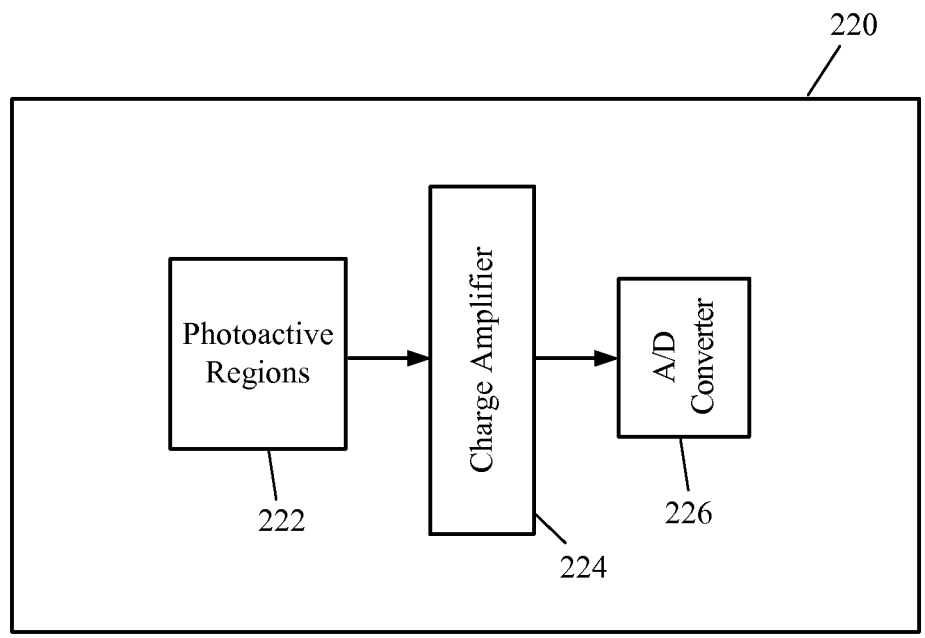
FIG. 4A illustrates a sensor according to a first embodiment.

FIG. 4A illustrates a sensor 220 according to a first embodiment. Sensor 220 is a charge-coupled device, and includes a plurality of photoactive regions 222 (e.g., capacitors), a charge amplifier 224, and an analog to digital (A/D) converter 226. Photoactive regions 222 accumulate an electrical charge from impinging light during an exposure period, the electrical charge corresponding to a single analog image. The accumulated electrical charged are transferred to charge amplifier 224, which converts the electrical charges into electrical voltages. A/D converter 226 then samples the electrical voltages so as to generate a digital image. According to one embodiment, the electrical voltages are sampled more than once per analog image so as to generate more than one digital image corresponding to the single analog image. For example, 2, 3, or more digital images may be generated from an analog image. For another example, 3 digital images may be generated from 2 analog images. For yet another example, 30 or 60 digital images may be generated from 5, 10, 15, 18, 20, or 25 analog images. One skilled in the art can readily derive other combinations where the number of digital images created over a given period is greater than the number of analog digital images created over the same period of time.

Figure 4B:
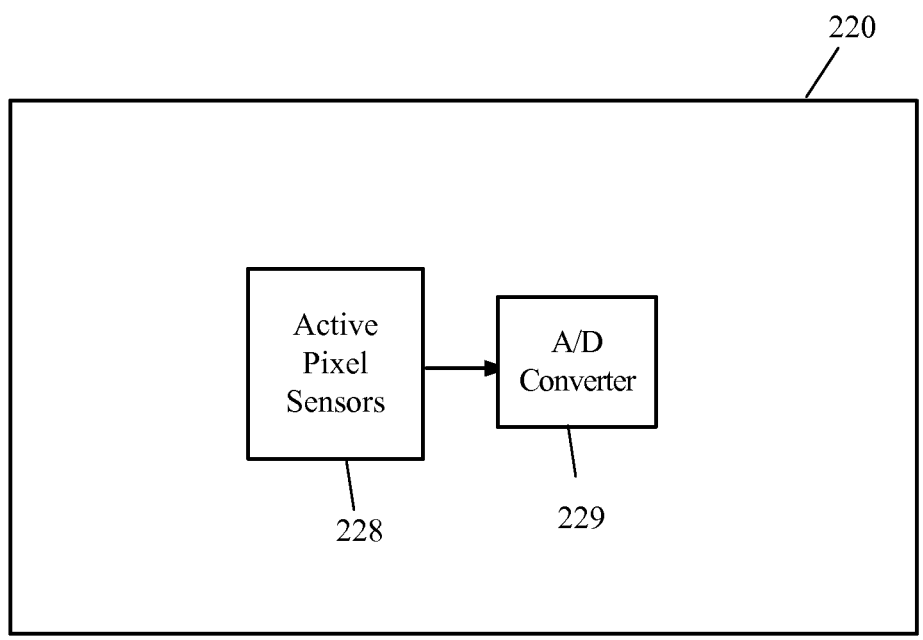
FIG. 4B illustrates a sensor according to a second embodiment.

FIG. 4B illustrates a sensor 220 according to a second embodiment. Sensor 220 includes a plurality of active pixel sensors 228 and an analog to digital (A/D) converter 229. Sensor 220 may be fabricated using, for example, a CMOS process. Active pixel sensors 228 each include a photodiode for integrating impinging light during an exposure period and providing an electrical voltage corresponding to the integrated light, the electrical voltage for the photodiodes corresponding to a single analog image. A/D converter 229 then samples the electrical voltages so as to generate a digital image. According to one embodiment, the electrical voltages are sampled more than once per analog image so as to generate more than one digital image corresponding to the single analog image. For example, 2, 3, or more digital images may be generated from an analog image. For another example, 3 digital images may be generated from 2 analog images. For yet another example, 30 or 60 digital images may be generated from 5, 10, 15, 18, 20, or 25 analog images. One skilled in the art can readily derive other combinations where the number of digital images created over a given period is greater than the number of analog digital images created over the same period of time.

A Method of Improving Perceived Light

Figure 5:
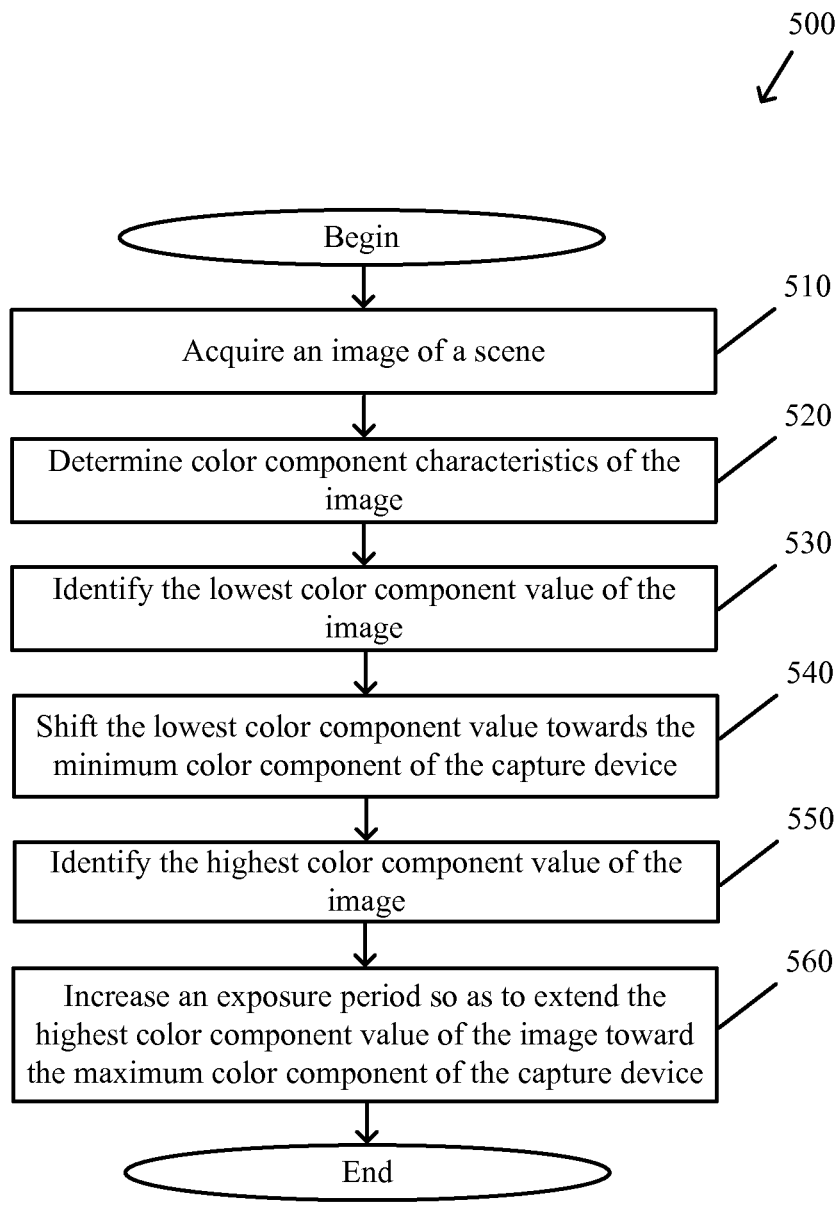
FIG. 5 shows a method of capturing images.

FIG. 5 shows a method 500 of capturing images. According to the method, an exposure period of a capture device may be adjusted such that the capturing device operates within a linear range of an exposure response characteristic. By operating in this range, the quality of captured images may advantageously be increased.

In step 510, an image of a scene is captured via a capture device, where the capture device is operable to capture images over a range extending from a color component minimum to a color component maximum. The capture device may be any suitable image capturing device. For example, electronic device 200 may be operable as the capture device. The capture device may be operable to capture and process images using any suitable color components, including red, green, blue (RGB) color components, hue, saturation, luminance (HSL) color components, etc. The range of each color component which the capture device may be operable to capture and process images over may be any suitable. For example, the capturing device may be operable to encode each image using an 8-bit color space, such that each color component is represented by values ranging from 0 to 255. For another example, the capturing device may encode each image using a 16-bit color space, such that each color component is represented by values ranging from 0 to 65,535.

In step 520, characteristics of a color component of the acquired image are determined, where the color component characteristics include a plurality of color component values and a unit value corresponding to each color component value, the unit value indicating the number of pixels in the image having the corresponding color component value. Various color components of the acquired image may be identified, such as hue, saturation, and luminance. For at least one of these color components, such as luminance, the unit values at least luminance level may be identified. For example, the luminance of the acquired image may be represented by luminance values ranging from 0 to 255, where a unit value for each luminance value indicates the luminance intensity at that particular luminance value. In one embodiment, the capture device determines such luminance characteristics of the acquired image.

In step 530, the lowest color component value of the image where the corresponding unit value is greater than a predetermined value is identified. For example, electronic device 200 may check each luminance value of the image from 0 to 255 to determine which of the 256 luminance values closest to zero has a corresponding unit value greater than 0. In other words, electronic 200 may process the luminance characteristics of the received image to identify the lowest luminance values contributing information to the image. In one embodiment, the lowest color component value may have a corresponding unit value greater than zero. In another embodiment, the lowest color component value may have a corresponding unit value greater than a value other zero, such as 2, 5, 10, or greater than 10.

In step 540, parameters of the capture device are adjusted so as to shift the lowest color component value of the image towards the color component minimum of the capture device. Any suitable parameter(s) resulting in a shift of the color component values may be used, such as an aperture of the capture device, an exposure bias of the device, etc. For example, an aperture size of electronic device 200 may be decreased. In one embodiment, the parameters are adjusted so that the lowest color component value of the image is shifted all the way to the color component minimum of the capture device. In other embodiments, the parameters are adjusted so that the lowest color component value of the image is shifted close to the color component minimum of the capture device. For example, where the color component minimum of the capture device is 0, the lowest color component value may be shifted to 0, 2, 4, 5, 10, in a range from 0 to 10, or greater than 10. Shifting the lowest color component to the color component minimum of the capture device may advantageously maximize the dynamic range of the capture device.

In step 550, the highest color component value of the image where the corresponding unit value is greater than a predetermined value is identified. For example, electronic device 200 may check each luminance value of the image from 0 to 255 to determine which of the 256 luminance values closest to 255 has a corresponding unit value greater than 0. In other words, electronic 200 may process the luminance characteristics of the received image to identify the highest luminance values contributing information to the image. In one embodiment, the highest color component value may have a corresponding unit value greater than zero. In another embodiment, the lowest color component value may have a corresponding unit value greater than a value other zero, such as 2, 5, 10, or greater than 10.

In step 560, an exposure period of the capture device is increased so as to extend the highest color component value of the image toward the maximum color component of the capture device. Increasing the exposure period may not only extend the highest color component value of the image, but also all of the color component values of the image other than the lowest color component value. In one embodiment, the exposure period may be increased so that the highest color component value of the image is extended all of the way to the maximum color component of the capture device. For example, where a shifted image has luminosity values ranging from 0 to 150, the exposure period may be increased so that the luminosity values range from 0 to 255. In other embodiments, the exposure period may be increased so that the highest color component value of the image extends close to the maximum color component of the capture device. For example, the exposure period may be increased so that the luminosity values range from 0 to 250, 245, or 240. Any other value close to 255 may also be used, such as a value in a range between 240 and 255, or less than 240. Extending the highest color component value of the image all the way to the maximum color component of the capture device advantageously maximizes the dynamic range of the capture device.

In one embodiment, determining color component characteristics of the image may include measuring the characteristics over a time period and excluding transitory color component values. For example, color component characteristics may be determined for a plurality of images, such as 5, 10, 15, or 30 images, or any number between 1 and 30 or greater than 30. The images may be analyzed to search for substantial increases in unit values for the color component values. A substantial increase may be, for example, a unit value that is 50%, 100%, or 150% greater than the average unit values for the color component, or in a range from 50% to 150%, or greater than 150%. For example, a substantial increase at a luminance value of 230 may be identified, where the unit value at luminance 230 is equal to 1000 and the average unit value at luminance 0 to 229 and 231 to 255 is equal to 100. Such luminance values may subsequently be ignored.

In one embodiment, the color component values are ignored only if the substantial increase is at a color component value greater than a predetermined color component value. For example, a predetermined luminance value may be 240. In such a case, a unit value at luminance 220 that is equal to 1000 will not be ignored, whereas a unit value at luminance 250 will be ignored.

The luminance values may be excluded in a variety of fashions. For example, when identifying the highest color component value of the image, the transitory color component value may not be used, even if it is the highest color component value. Rather, a second highest color component value may be identified. Such transitory color component values may be, for example, light resulting from camera flashes, window pans, or other temporary light sources, where calibration of the capture device based on such light sources is undesirable due to their temporary nature.

According to some embodiments, once the exposure period is increased, the exposure period may be fixed for the capturing and processing of subsequent images. The exposure period may be fixed in that the same exposure period is applied to the processing of subsequent images. In some embodiments, the exposure period may be automatically readjusted by performing steps 510 to 560 again. For example, where a significant change in color component characteristics of the image is identified, the exposure period may be readjusted. For another example, the exposure period may be readjusted after certain period of time, such as 1 minute, 5 minutes, 10 minutes, a range from 1 to 10 minutes or greater than 10 minutes, etc. For yet another example, the exposure period may be manually readjusted in response to a user input. That is, in response to a user input, steps 510 to 560 may be performed again so as to set the exposure period of the capture device.

Figure 6A:
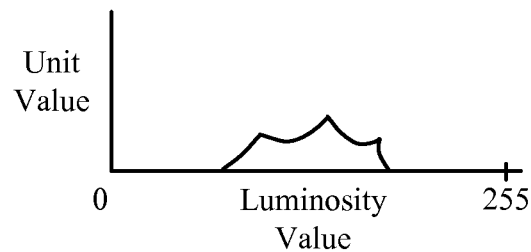
FIG. 6A shows the luminosity characteristics of an acquired image.
Figure 6B:
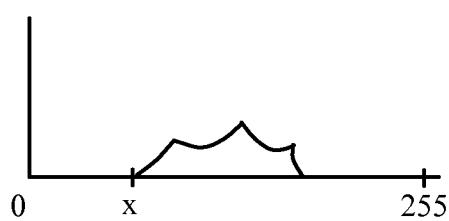
FIG. 6B shows an identification of the lowest luminosity value of the image.
Figure 6C:
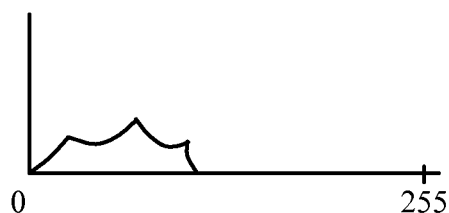
FIG. 6C shows the luminosity characteristics of the image after the lowest luminosity value (i.e., 'X') has been shifted toward the minimum luminosity value of the capture device (i.e., 0).

FIGS. 6A to 6C show an example of luminosity characteristics of an acquired image as the image is captured in accordance with the method discussed with reference to FIG. 5. FIG. 6A shows the luminosity characteristics of an acquired image. The capturing device is operable to process images in an 8-bit HSL color space. Accordingly the luminosity characteristics of the image are distributed over up to 256 luminosity values. Here, the luminosity characteristics of the image are not distributed over the entire 256 luminosity values, but rather only over a subset. To increase the dynamic range of the image and subsequently captured image, it may be desirable to configure the capture device such that the image luminosity values extend from 0 to 255.

FIG. 6B shows an identification of the lowest luminosity value of the image. The lowest luminosity value of the image is identified as 'X'. As mentioned, the lowest luminosity value may be the lowest luminosity value having a unit value greater than 1. However, other thresholds may be used.

FIG. 6C shows the luminosity characteristics of the image after the lowest luminosity value (i.e., 'X') has been shifted toward the minimum luminosity value of the capture device (i.e., 0). As shown, all of the luminosity values of the image may be equally shifted toward the minimum luminosity value of the capture device. As mentioned, the image need not be shifted all the way to 0. Rather, it can be shifted to a location proximate to 0.

Figure 6D:
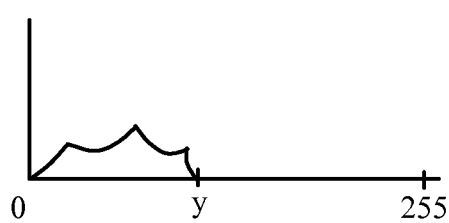
FIG. 6D shows an identification of the highest luminosity value of the image.

FIG. 6D shows an identification of the highest luminosity value of the image. The highest luminosity value of the image is identified as 'Y'. As mentioned, the highest luminosity value may be the highest luminosity value having a unit value greater than 1. However, other thresholds may be used.

Figure 6E:
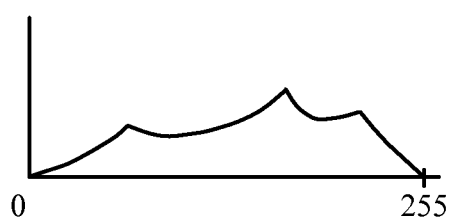
FIG. 6E shows the luminosity characteristics of the image after an exposure period of the capture device has been increased.

FIG. 6E shows the luminosity characteristics of the image after an exposure period of the capture device has been increased. As a result of increasing the exposure period, the luminosity characteristics of the image are stretched over the entire luminosity range of the capture device. As mentioned, the exposure period need not be adjusted so that the luminosity characteristic of the image are stretched over the entire luminosity range of the capture device. Rather, it may be stretched over substantial portions of the luminosity range.

Figure 7A:
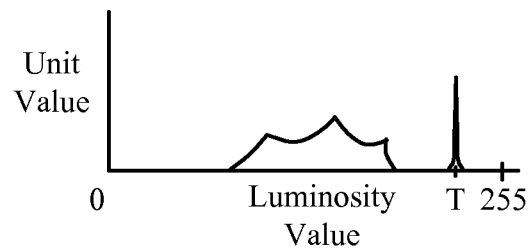
FIG. 7A shows the luminosity characteristics of an acquired image including a transitory luminosity value.

FIGS. 7A to 7D show an example of luminosity characteristics of an acquired image as the image is captured in accordance with the method discussed with reference to FIG. 5, where the acquired image includes a transitory luminosity value. FIG. 7A shows the luminosity characteristics of an acquired image including a transitory luminosity value. The acquired image and capture device is similar to that discussed above with reference to FIG. 6A with the exception of the transitory luminosity value. The transitory luminosity value is identified as a luminosity value 'T', and has a unit value significantly greater than the unit values of other luminosity values of the image.

Figure 7B:
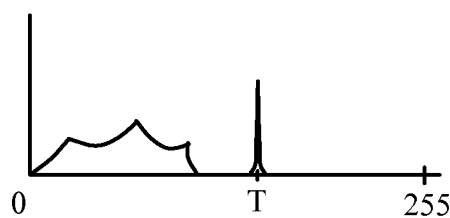
FIG. 7B shows the luminosity characteristics of the image with a transitory value after the lowest luminosity value has been shifted.

FIG. 7B shows the luminosity characteristics of the image with a transitory value after the lowest luminosity value has been shifted. In this case, the transitory value has been shifted with the non-transitory luminance values. This shift is similar to the shift previously discussed with reference to FIGS. 6B and 6C.

Figure 7C:
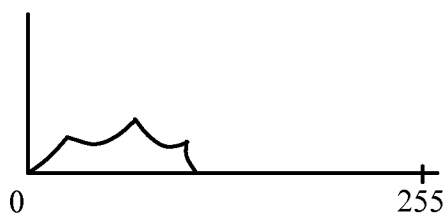
FIG. 7C shows the luminosity characteristics of the image with the transitory value being ignored.

FIG. 7C shows the luminosity characteristics of the image with the transitory value being ignored. For example, the transitory value may be filtered. In some embodiments, the transitory value may be filtered only if it is at a luminance value greater than a predetermined value.

Figure 7D:
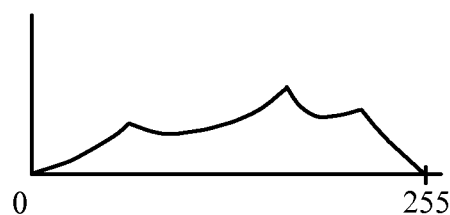
FIG. 7D shows the luminosity characteristics of the image with a transitory value after an exposure period of the capture device has been increased.

FIG. 7D shows the luminosity characteristics of the image with a transitory value after an exposure period of the capture device has been increased. This increase is similar to that discussed above with reference to FIGS. 6D and 6E. In this case, the transitory value has been filtered, and thus the highest luminance value identified corresponds to the highest luminance value of the non-transitory portions of the image. However, in other cases, the transitory value may not be filtered. Rather, when identifying the highest luminance value, the luminance value of the transitory portion is ignored and the luminance value of the non-transitory portion is used. As a result of increasing the exposure period, the transitory value may then effectively be clipped from the image.

Figure 8:
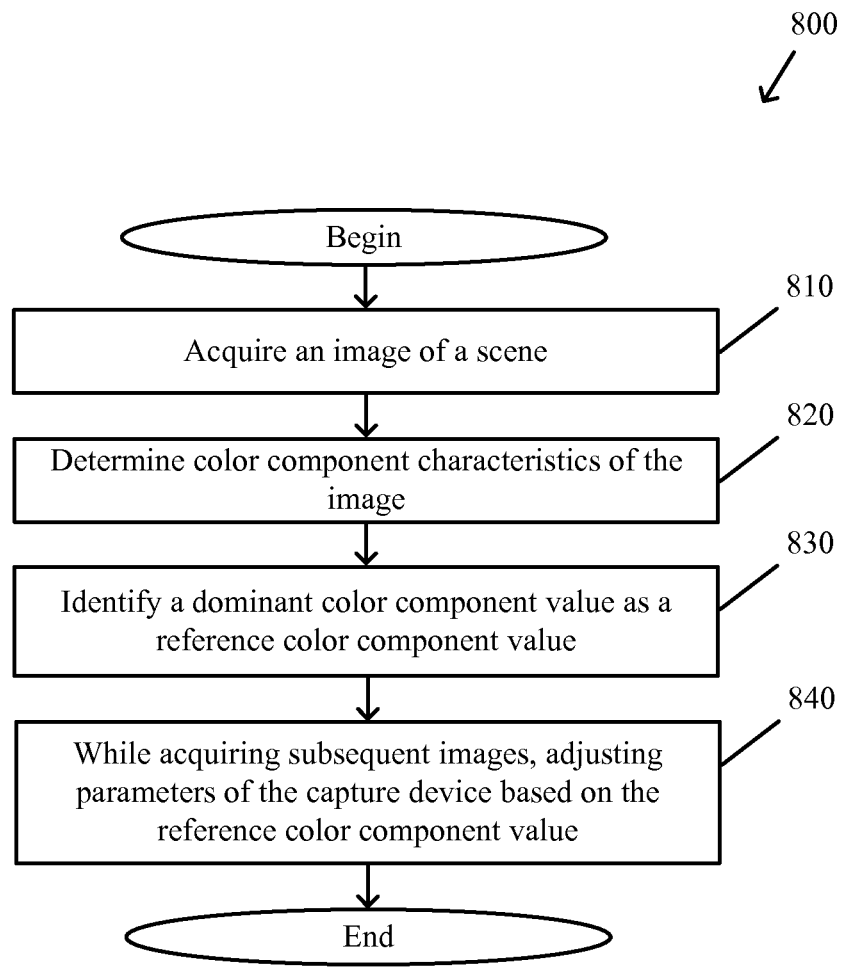
FIG. 8 shows a method of capturing images.

FIG. 8 shows a method of capturing images. By holding a light level constant while capturing images, a light performance may advantageously be increased. That is, traditional video encoding systems continuously adjust the brightness and contrast (light) level of a picture as the picture changes (environmental changes, panning, tilting, zooming, etc.). However, increased compression and/or higher quality image reproduction may be achieved when the light level is held constant regardless of environmental/camera changes.

In step 810, an image of a scene is acquired. For example, an image may be acquired as discussed above with reference to step 510. In step 820, color component characteristics of the image are determined. For example, color component characteristics may be determined similar to that discussed above with reference to step 520.

In step 830, a dominant color component value from a plurality of color component values of the acquired image is identified as a reference color component value. The dominant color component value may be, for example, the color component value having the highest unit value for all color component values of the image. For example, an image may be represented by 256 luminance values, where the 256 luminance values have unit values ranging from 0 to 250, and the luminance value of 114 has the unit value of 250. In such a case, the dominant luminance value would be identified as the luminance value of 114. The luminance value of 114 may thereafter be identified as a reference luminance value.

In step 840, parameters of the capture device are adjusted based on the reference color component value while acquiring subsequent images. Various types of parameters may be adjusted, such as the aperture size, exposure period, etc. In one embodiment, the exposure period is not modified, but rather is fixed in accordance with the method discussed with reference to FIG. 5.

In one embodiment, the parameters of the capture device may be adjusted so as to shift color component characteristics of subsequent images such that dominant color component values of the subsequent images are shifted toward the reference color component value. For example, subsequent images may be captured by the capture device. As the subsequent images are captured, their color component characteristics may be analyzed. In doing so, the dominant color component value of each subsequent image may be identified. As images have a tendency to change over time, the dominant color component value of each subsequent image may also change over time. In response to such a change, parameters of the capture device may be adjusted so as to force the dominant color component value of each subsequent image to be shifted toward or to the reference value.

Figure 9A:
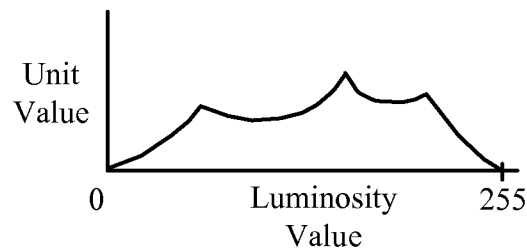
FIG. 9A shows the luminosity characteristics of an acquired image.

FIGS. 9A to 9D show an example of luminosity characteristics of acquired images as they are captured in accordance with the method discussed with reference to FIG. 8. FIG. 9A shows the luminosity characteristics of an acquired image. The acquired image and capture device is similar to that discussed above with reference to FIG. 6A. In one embodiment, the acquired image may be similar to that discussed above with reference to FIG. 6E. That is, the exposure period of the capturing device may be increased so as to extend the highest color component value of the image toward the maximum color component of the capture device.

Figure 9B:
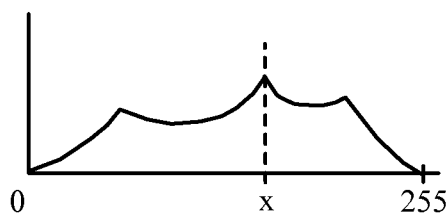
FIG. 9B shows an identification of the dominant color component value of the acquired image.

FIG. 9B shows an identification of the dominant color component value of the acquired image. Here, the dominant color component value is the luminosity value having the highest unit value, and is identified as 'X'. Once the dominant color component value is identified, that is, once 'X' is identified, that value may be stored by the capture device.

Figure 9C:
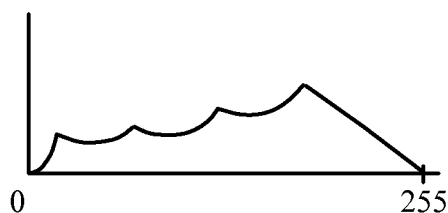
FIG. 9C shows a luminosity characteristic of a subsequent image.

FIG. 9C shows a luminosity characteristic of a subsequent image. The subsequent image may be acquired similar to that discussed with reference to FIG. 9A.

Figure 9D:
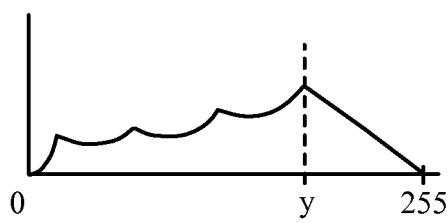
FIG. 9D shows an identification of a dominant color component value of the subsequent image.

FIG. 9D shows an identification of a dominant color component value of the subsequent image. This identification is similar to that discussed with reference to FIG. 9B, however, in this case, the dominant luminosity value is identified as 'Y'.

Figure 9E:
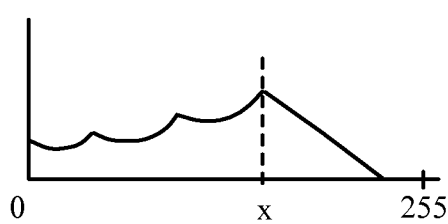
FIG. 9E shows the luminosity characteristics of the subsequent image after the parameters of the capture device have been adjusted to shift the dominant color component value of the subsequent image.

FIG. 9E shows the luminosity characteristics of the subsequent image after the parameters of the capture device have been adjusted to shift the dominant color component value of the subsequent image. That is, the luminosity characteristics of the subsequent image have been shifted so that the dominant luminosity value of the subsequent image is equal to or close to X. The dominant luminosity value need not be exactly equal to X, but could be close to X. For example, if X is a luminance value of 185, the dominant luminosity value of the subsequent image may be shifted to 180 or 190. By using characteristics of an original image as reference characteristics for subsequent images, changes in the subsequently encoded images may be reduced, thereby advantageously increasing the compression capabilities of the encoder.

A Method of Adding Estimated Noise Levels

Figure 10:
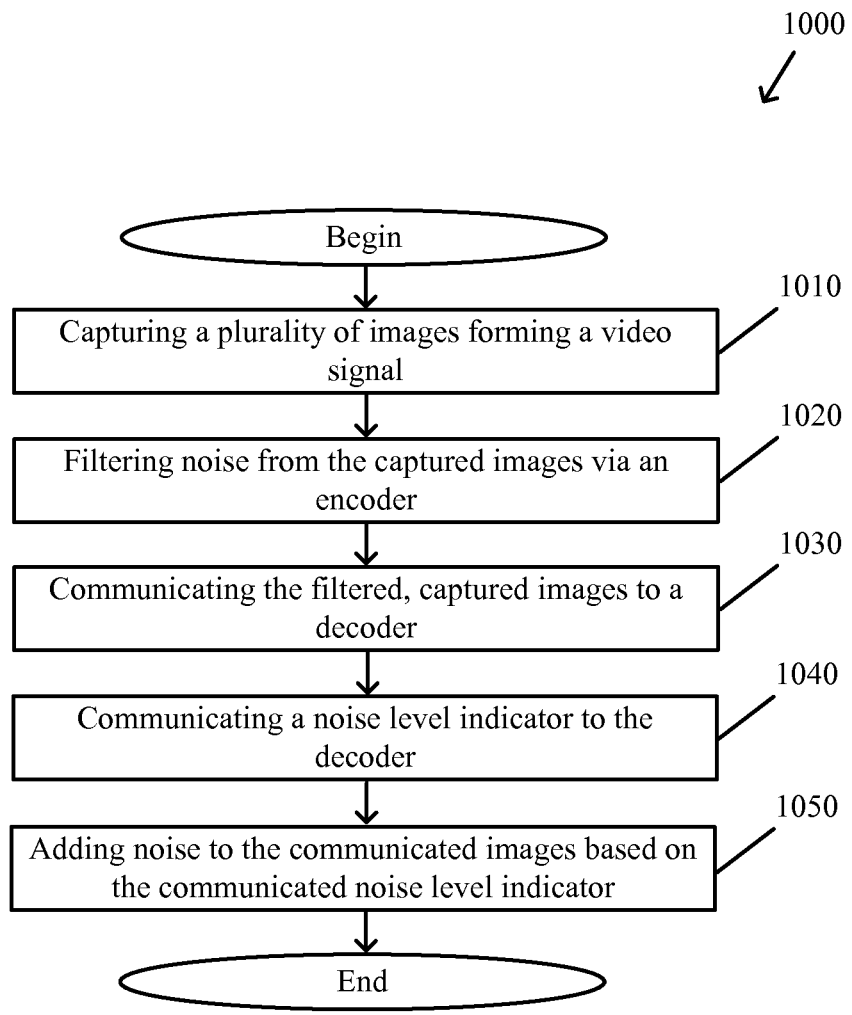
FIG. 10 shows a method of communicating a video signal according to a first embodiment.

FIG. 10 shows a method of communicating a video signal according to a first embodiment. In step 1010, a plurality of images forming a video signal are captured. For example, a sensor 220 of first electronic device 110 may capture a plurality of images to form a video signal. In step 1020, noise is filtered from the captured images. For example, at least one of video preprocessor 230 and video encoder 240 of first electronic device 110 may filter noise from the images. Any suitable filtering algorithms may be used, including linear filtering, non-linear filtering, anisotropic diffusion, etc. Further, the images may be separated into various elements prior to filtering and different filtering may be applied to each element. For example, the images may be separated into chroma and luminance components, and a greater amount of filtering may be applied to the chroma component than the luminance component.

In step 1030, the filtered, captured images are communicated to a decoder. For example, the images may be communicated to second electronic device 120 via network interface 280 of first electronic device 110 and network 130. In some cases, network 130 may simply be a direct, wired connection to the second electronic device 120. Like first electronic device 110, second electronic device 120 may have one or more of the components of electronic computing device 200, including a decoder for decoding. The decoder may be part of control processor 250 or, in other words, control processor 250 may perform the function of decoding.

In step 1040, a noise level indicator is communicated to the decoder. For example, first electronic device 110 may communicate a noise level indicator to second electronic device 120.

The noise level information may be an estimate of an amount of random noise generated by first electronic device 110. In some embodiments, the noise level information is pre-stored for different types of electronic devices, and may be different depending on the bit rate. For example, for a particular electronic device, the noise level information corresponding to that device may be pre-determined. The noise level information may be different for different bit rates. For example, a low bit rate may be associated with a relatively high noise level, whereas a high bit rate may be associated with a relatively low noise level. Pre-determining the noise level information in this context may include manually adjusting the noise level at each bit rate until a reproduced image having the noise added therein appears to be aesthetically pleasing. In other embodiments, the noise level information may be generated by the electronic device. For example, first electronic device 110 may estimate the amount of noise generated by first electronic device 110 when capturing an image. The estimate may include estimates of any suitable characteristic of first electronic device 110 for which noise may be generated, including noise estimates for quantization errors generated by A/D converters used in sensor 220, distortion errors generated by lens 210, encoding errors generated by video encoder 240, etc.

Accordingly, the noise level information may be determined and stored. In one embodiment, first electronic device 110 may store noise level information for each of a plurality of bit rates. Bit rates may be any suitable bit rate, such as 128 bps, 256 bps, 512 bps, 1 Mbps, etc. Noise level information may include one or more characteristics of noise, such as amplitude, mean, standard deviation, energy density, energy distribution, etc. A noise level indicator may then uniquely reference particular noise level information for a given bit rate. The noise level indicator may be stored at first electronic device 110, for example, in storage medium 260.

Once noise level indicators information has been stored, in operation, first electronic device 110 may then determine a bit rate at which the filtered, capture images are to be encoded. Such a determination may be made either by a user selection of a bit rate or by control processor selecting an appropriate bit rate based on information from a recipient device such as second electronic device 120. The noise level indicator corresponding to bit rate at which images are encoded and subsequently communicated to second electronic device 120, may then also be communicated to second electronic device 120.

In step 1050, noise is added to the communicated images based on the communicated noise level indicator. In one embodiment, second electronic device 120 receives the noise level indicator. Second electronic device 120 stores a table in, for example, storage medium 260, that indicates particular noise levels for a plurality of noise level indicators. Accordingly, second electronic device 120 (e.g., control processor 250) may search storage medium 260 to determine whether there is stored a particular noise level for the received indicator. If there is a match, control processor 250 may add noise to the received images in accordance with the noise characteristics corresponding to the received noise level indicator. In some embodiments, the noise is not equally added to all elements of the decoded image. Rather, noise may be added equally or in different amounts to different elements of the decoded image. For example, some noise may be added to a luminance component of the decoded image, while no noise may be added to a chroma component.

Adding noise that is based on an estimated transmitter noise characteristic may advantageously improve the subjective and perceived picture quality of a digitally encoded picture.

Reducing Latency by Spatial Encoding

Figure 11:
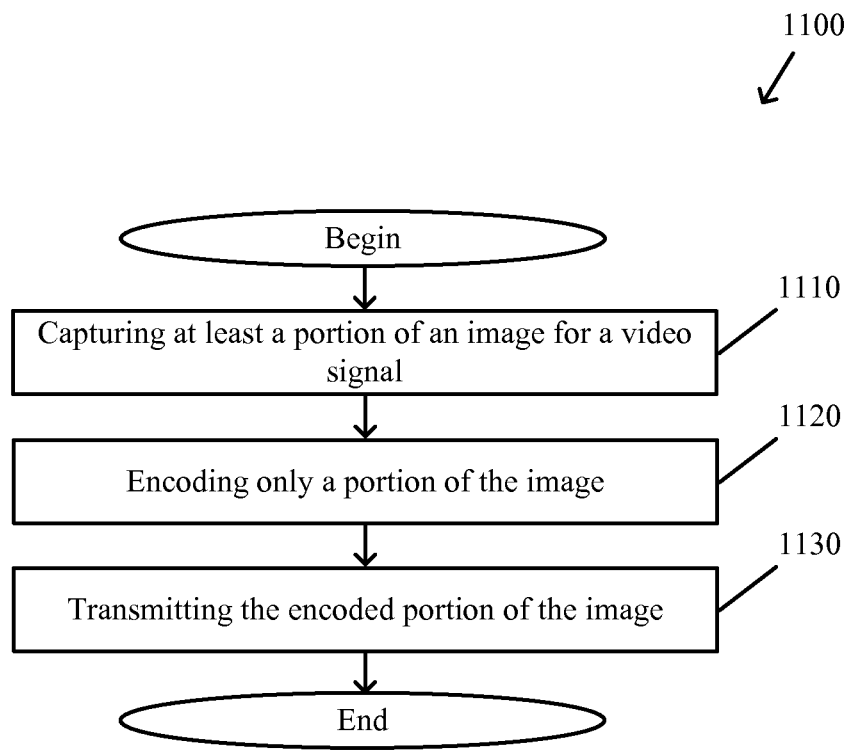
FIG. 11 shows a method of communicating a video signal according to a second embodiment.

FIG. 11 shows a method of communicating a video signal according to a second embodiment. In step 1110, at least a portion of an image for a video signal is captured. For example, sensor 220 may capture at least a portion of an image based on light passing through camera lens 210 and impinging on sensor 220. In one embodiment, an entire image is captured by sensor 220. In another embodiment, only a portion of an image is captured by sensor 220. Any suitable technique for capturing only a portion of an image may be used. For example, where sensor 220 is a CMOS active pixel sensor, a windowing technique may be used.

In step 1120, only a portion of the image is encoded. For example, video encoder 240 may encode only a portion of an image focused by camera lens 210. In one embodiment, sensor 220 may capture an image focused by lens 210. In such a case, video encoder 240 may encode only a portion of the captured image. In another embodiment, sensor 220 may capture only a portion of an image focused by lens 210. In such a case video encoder 240 may encode the entire image captured by sensor 220, again resulting in encoding of only a portion of the image focused by lens 210. Alternatively, in such a case video encoder 240 may encode only a portion of the captured image (which is already a portion of the focused image), resulting in encoding of a sub-portion of the image focused by lens 210.

The encoded portion may be any suitable portion. In one embodiment, the focused image is spatially separated. For example, it may be separated into a plurality of horizontal bands that extend entirely across the image. For another example, it may be separated into a plurality of vertical bands. For yet another example, it may be separated into shapes having the same size, such as a plurality of squares, rectangles, etc. The shapes may be evenly, or randomly, distributed. Or, the image it may be separated into shapes having different sizes or even different shapes, such as a square shape in the middle of the image, and rectangular shapes surrounding the middle of the image.

The focused image may be captured and encoded in a sequence such that a center of the image is encoded before other portions of the image. For example, if the image is separated into horizontal bands, a horizontal band passing through the center of the image may be encoded first. Subsequently, horizontal bands located above and below the center of the image may be encoded. For another example, if the image is separated into vertical bands, a vertical band passing through the center of the image may be encoded first. Subsequently, vertical bands located on each side of the center of the image may be encoded. For yet another example, if the image is separated into a plurality of squares or other shapes, a first square or other shape located at the center of the image may be encoded first. Subsequently, other portions of the image located outside of the center of the image may be encoded.

The portions of the image may be encoded using any suitable encoding algorithm. For example, the portions may be encoded into I-frames, P-frames (Predicted-frames), and B-frames (Bidirectional-frames). In one embodiment, each portion is encoded into an I-frame. For example, instead of encoding an entire focused image into one large I-frame, only portions of the image (portions that are suitable for reconstructing the entire focused image) may be encoded into individual I-frames.

In step 1130, the encoded portions of the image are transmitted. For example, control processor 250 may cause the portions encoded by video encoder 240 to be communicated over network 130 via network interface 280. In some embodiments, the portions may be transmitted immediately after they are encoded. In other embodiments, the portions may be transmitted a number of times after they are encoded. For example, the same portion may be transmitted 2, 3 or more times. The identical portions may be sent immediately after one another, or may be interspersed with other portions.

As previously mentioned, the portions of the image may be encoded into individual I-frames. In one embodiment, the I-frames constituting the entire image may be serially transmitted immediately after one another. In other embodiments, one or more B-frames or P-frames may be interposed between I-frames. B-frames and P-frames may encode only changes in the image portions encoded in the I-frames, or may encode changes to the entire focused image. In some embodiments, the same I-frame may be sent multiple times.

Video communication currently has a significant startup latency (e.g., the time to display a first picture). This is often due to delays caused by one or more of call setup, video capture, video encoding, transmission of encoded pictures, error recovery, and video decoding. Of these, video encoding frequently causes the largest delay due to the nature of key frames (e.g., I-frames), as the key frames contain the largest amount of image information. By separating an image spatially into a number of portions so as to reduce the size of the key frames, startup latency may advantageously be reduced. By encoding and transmitting a center portion of an image first, the most important information of interest may be communicated first. For example, in teleconferencing applications, a participant's face is typically located approximately at the center of image, and thus transmission of this portion first may advantageously result in the timely recreation of the areas of interest. Further, since the encoding and transmission time may be significantly reduced by encoding and transmitting only portions of an image, identical portions may be communicated a plurality of times so as to reduce potential delays caused by data loss and the subsequent request for resending data.

Figure 12:
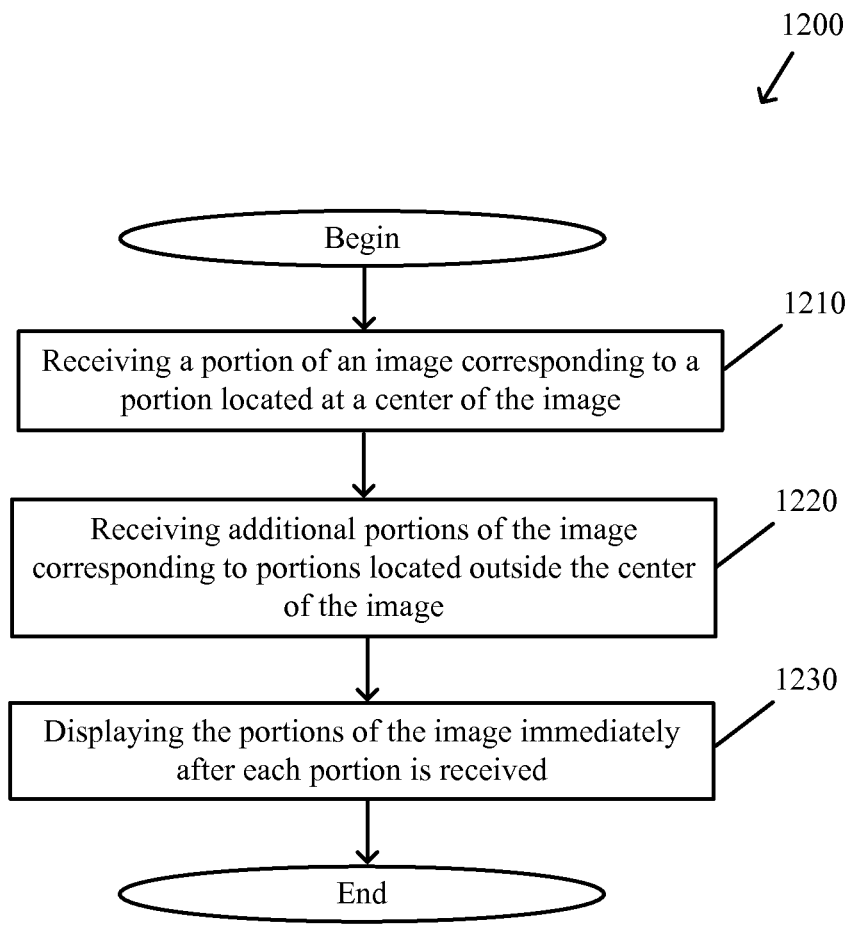
FIG. 12 shows a method of generating a video signal.

FIG. 12 shows a method of generating a video signal. In step 1210, a portion of an image corresponding to a portion located at the center of the image is received. For example, second electronic computing device 120 may receive a portion of an image captured and encoded by first electronic computing device 110. Second electronic computing device 120 may receive the portion via network interface 280. The portion may be any of the portions previously discussed with reference to FIG. 7. After receiving the portion, second electronic computing device 120 may temporarily store the portion in, for example, storage medium 260.

In step 1220, additional portions of the image corresponding to portions located outside the center of the image are received. For example, second electronic computing device 120 may receive additional portions via network interface 280. The additional portions may be any of the additional portions located outside the center of the image previously discussed with reference to FIG. 7.

In step 1230, the portions of the image are displayed immediately after each portion is received such that the portion located at the center of the image is displayed first followed by display of the portions located outside the center of the image. For example, second electronic computing device 120 may receive portions of an image via network interface 280. Control processor 250 may operate to decode the received portions, and then send the decoded portions to display 270 for display to a user. The portions may be decoded and display immediately after they are received. For example, once the center portion is received, control processor 250 may immediately decode and cause it to be displayed. As other portions are received, control processor 250 may immediately decode them and cause them to be displayed.

In some embodiments, at least some transmitted portions of the image may first be accumulated before being displayed. For example, second electronic computing device 120 may receive and buffer (e.g., store in storage medium 260) a number of portions. Once a number of portions have been buffered, control processor 250 may decode the buffered portions and provide them for display. Alternatively, control processor 250 may decode portions immediately after they are received, but not present them for display until a number of portions have been decoded.

As previously discussed, video communication currently has a significant startup latency (e.g., the time to display a first picture). By decoding and displaying received image portions as soon as they arrive or at least before an entire image is received, latency's caused by waiting for an entire image to be received and decoded are advantageously reduced or avoided.

Next Generation Teleconferencing Management

Figure 13:
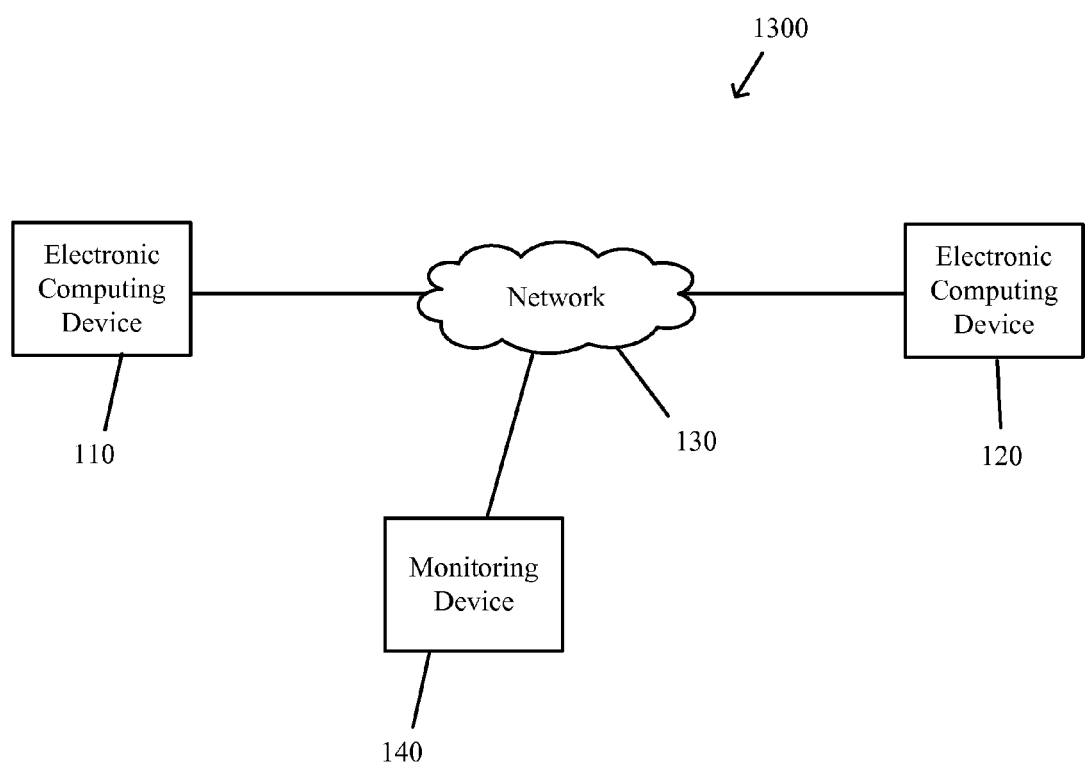
FIG. 13 depicts a high level diagram of a monitoring system.

FIG. 13 depicts a high level diagram of a monitoring system 1300. Monitoring system 1300 includes the same elements as discussed with reference to FIG. 1, and as such the previous discussions with reference to FIG. 1 are equally applicable herein. Further, monitoring system 1300 also includes a monitoring device 140. Monitoring device 140 includes one or more components of electronic computing device 200. For example, in one embodiment, monitoring device 140 includes a control processor 250, storage medium 260, and network interface 280.

Monitoring device 140 may operate to monitor communications between the first and second electronic computing devices, and/or may operate to monitor processing performed by at least one of first and second electronic computing devices, and/or may operate to monitor video received and/or processed by at least one of first and second electronic computing devices. For example, monitoring device 140 may monitor video received by first and second electronic computing devices. Monitoring device 140 may also be operable to not only monitor, but also control at least one of first and second electronic computing devices. For example, monitoring device 140 may cause first electronic computing device 110 to establish a communication link with second electronic computing device 120.

In some embodiments, monitoring device 140 is not separate from first and second electronic computing devices. Rather, the hardware and/or functionality of monitoring device 140 may be incorporated into at least one of first and second electronic computing devices. For example, first electronic computing device 110 may operate as a monitoring device, and thus monitor and/or control operations of second electronic computing device 120. However, for the sake of readability, the remaining discussion refers to the monitoring device 140 as an independent element, although embodiments of the invention are not so limited.

Figure 14:
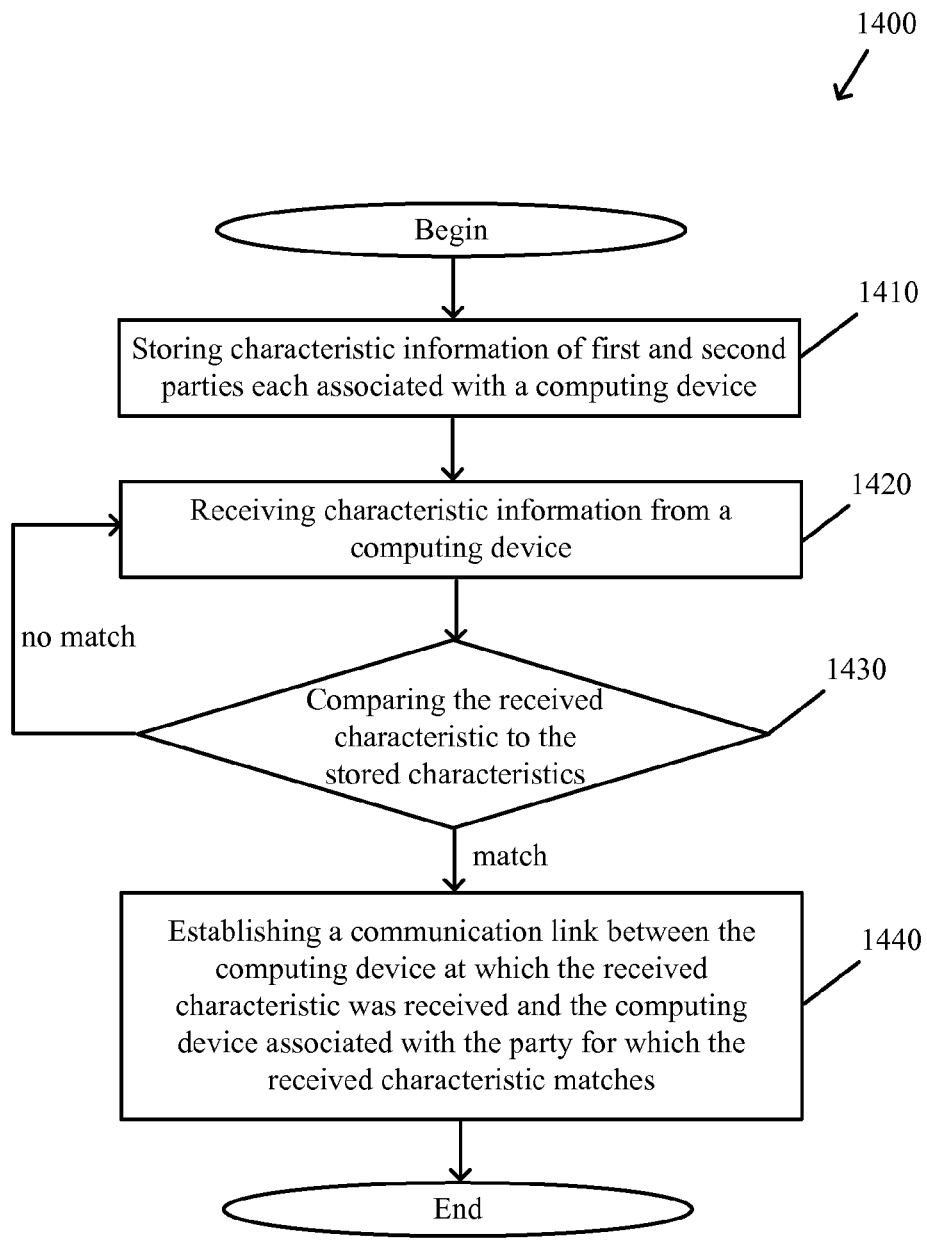
FIG. 14 shows a method of initiating a communication between two parties.

FIG. 14 shows a method of initiating a communication between two parties. It is advantageous to reduce the interaction required for users of communication systems such as videoconferencing systems, telepresence systems, video-broadcasting systems to facilitate communication amongst one another. In one embodiment, the monitoring system discussed with reference to FIG. 13 may be used to initiate communication links such as a video link using characteristic information, such as an facial images. In such a system, users simply need to set up a meeting or a broadcast time using common corporate tools, such as Outlook by Microsoft Corp. of Redmond, Wash. The monitoring system then monitors those requests and if one or more of the users get in front of a video capturing device coupled to the system, the system will initiate a communication link such as a video-link call between the points where the users are located and without the need to press any button. For example, monitoring device 140 may operate to perform such monitoring and subsequently establish a communication link between first electronic computing device 110 and second electronic computing device 120.

In step 1410, characteristic information of first and second parties each associated with a computing device are stored. The characteristic information may include any suitable information that sufficient to identify a particular party. Characteristic information may include, for example, facial images, voice samples, images of identification cards, etc. Monitoring device 140 may store characteristic information of a person associated with first computing device 110, and characteristic information of a person associated with second computing device 120. In some embodiments, monitoring device 140 may store characteristic information of multiple people associated with each computing device. For example, multiple people may log into an operating system of a computing device. Such characteristic information may be stored, for example, in storage medium 260.

In step 1420, characteristic information is received from a computing device. For example, first electronic computing device 110 may include elements for capturing at least one of video, images, and audio. In some embodiments, video may continuously be captured such that images of the captured video are continuously communicated to monitoring device 140. In other embodiments, images may be captured and communicated sporadically, such as once every second, once every 30 seconds, once every 60 seconds, and the like, or in a range between once a second and once every 60 seconds, or at a frequency less than once every 60 seconds or greater than once a second. In other embodiments, audio may be captured and communicated simultaneously with at least one of video and images.

According to one embodiment, first electronic computing device 110 may begin capturing information automatically. For example, when electronic computing device 110 is enabled, or when a user logs into electronic computing device. In one case, first electronic computing device 110 may begin capturing video at a predetermined time. For example, when a user of first electronic computing device 110 has previously scheduled a meeting, teleconference, telepresence meeting, etc., with another user, such as a user of second electronic computing device 120, the meeting will be for a set date and time. First electronic computing device 110 may begin capturing video at the set date and time, regardless of whether the user of first electronic computing device 110 is present. According to another embodiment, first electronic computing device 110 may begin capturing information upon manual activation. For example, a user may manually enable video capture on first electronic computing device 110 before a scheduled meeting between the user of first electronic computing device 110 or another user of first electronic computing device 110.

Various computer software for scheduling a meeting, teleconference, telepresence meeting, one-way video broadcast, and the like may be utilized. For example, conventional time-management software such as Outlook, provided by Microsoft Corp. of Redmond, Wash., may be used. Monitoring device 140 may integrate with or monitor such software so as to be able to identify the time and date of scheduled meetings and the intended participants of such meetings.

In step 1430, the received characteristic information is compared to the stored characteristic information to determine whether the stored characteristic information matches the characteristic information of one of the first and second parties. For example, on receiving images from first electronic computing device 110, monitoring device 140 may compare the received images to the previously stored images.

According to one embodiment, the stored characteristic information may correspond to characteristic information of parties scheduled to have a meeting, teleconference, etc. For example, the first and second parties may be scheduled to have a meeting a predetermined date and time. Images of the first and second parties may be stored (in some cases, along with images of other parties) at monitoring device 140, e.g., in storage medium 260. The images received from first electronic computing device 110 may then be compared to these stored images to determine whether or not the received images match the stored images. Accordingly, it may be determined whether a party scheduled for a meeting has become present at first electronic computing device 110.

If the received characteristic information does not match the characteristic information of one of the first and second party, processing returns to step 1020. For example, monitoring device 140 may continue to receive images from first electronic computing device 110. If, on the other hand, the received characteristic information does match the characteristic information of one of the first and second party, processing may continue to step 1440.

In step 1440 a communication link is established between the computing device at which the received characteristic information was received and the computing device associated with the party for which the received characteristic information matches. For example, if the received characteristic information matches, monitoring device 140 may establish a communication link between first electronic computing device 110 and second electronic computing device 120. Any suitable comparison algorithms may be used to determine whether the characteristic information matches. For example, where images are received, image processing algorithms may be used to determine whether the images match, where the image processing algorithms include feature-matching algorithms, template-matching algorithms, etc.

Establishing a communication link may include causing one or more of the electronic computing devices to perform various functionality. For example, in teleconferencing applications, the first communication link may include causing captured video and/or audio from first electronic computing device 110 to be communicated to second electronic computing device 120 for display to second electronic computing device 120. In some embodiments, establishing the first communication link may include causing second electronic computing device 120 to begin capturing video and/or audio and communicating the captured video and/or audio to first electronic computing device 110.

The communication link may be any suitable communication link. For example, the communication link may use one or more of TCP/IP, UDP, ISDN, Ethernet, etc. In some cases, the communication link may be a wireless communication link utilizing any suitable wireless communication protocol such as Bluetooth, IEEE 802.11, GSM, 3G, 4G, WiMax, etc. The communication link may communicate any suitable information. For example, the communication link may communicate video, audio, and/or video or audio. In some cases, the communication link may communicate commands from one electronic computing device to another electronic computing device.

In one embodiment, as part of a first communication link, images of first and second parties may be received. For example, as part of a first communication link between first electronic computing device 110 and second electronic computing device 120, in which images captured by first electronic computing device 110 are communicated to second electronic computing device 120, and/or images captured by second electronic computing device 120 are communicated to first electronic computing device 110, monitoring device 140 may monitor such communications. In doing such monitoring, monitoring device 140 may receive such images.

After receiving the images from at least one of the first and second electronic computing device, monitoring device 140 may detect the absence of one of the parties. For example, monitoring device 140 may receive images from first electronic computing device 110 and process the received images to determine whether the first party is located within the received images. If the first party can not be found within a number of received images (e.g., 1, 10, 30, 300, more than 300, or a range from 1 to 300), monitoring device 140 may determine that the first party has become absent.

If monitoring device 140 detects the absence of one of the parties, monitoring device 140 may establish a new communication link with another electronic device associated with the absent party. For example, if monitoring device 140 detects the absence of the first party, monitoring device 140 may establish a new communication link between second electronic computing device 120 and a second computing device associated with the first party. This may be done, for example, by pre-storing an identifier identifying the second computing device associated with the first party, and using the pre-stored identifier when the absence of the first party is detected. In some embodiments, the old communication link between first electronic computing device 110 and second electronic computing device 120 may be disconnected after establishment of the new communication link. The new communication link may be any of the communication links previously discussed.

The second computing device associated with the first party may be any suitable electronic computing device. For example, it may be a desktop based-computer, laptop, netbook, PDA, mobile telephone, smart phone, tablet, IP phone, etc. and include one or more components of electronic computing device 200.

In some embodiments, information about one or more of the parties may be displayed on one or more of the electronic computing devices. For example, information about the first party may be displayed on second electronic computing device 120. The information may be displayed simultaneous with video being communicated from first electronic computing device 110 to second electronic computing device 120. In some embodiments, the information may be displayed before the video is communicated to second electronic computing device 120. In one embodiment the second party may selectively choose to accept the incoming video, whereas in another embodiment monitoring device 140 forces the video to be displayed.

The information about the parties may be any suitable information. For example, the information may include a picture, a job title, a company affiliation, a name, etc. The information may be stored in any suitable storage device. For example, the information may be stored in monitoring device 140. Alternatively, the information may be stored in first electronic computing device 110 and/or second electronic computing device 120.

In some embodiments, the information about a party may be displayed when the party becomes visible. For example, monitoring device 140 may monitor a video stream being communicated from first electronic computing device 110. If monitoring device 140 detects that a particular party is present, monitoring device 140 may cause information about that particular party to be displayed by second electronic computing device 120. Such monitoring and display may be applicable to multiple parties associated with the same device. For example, monitoring device 140 may detect a plurality of parties present at first electronic computing device 110. Monitoring device 140 may then cause information about all or only some of the detected parties to be displayed by second electronic computing device 120.

In some embodiments, the information about a party may be displayed when the party speaks. For example, monitoring device 140 may monitor a video stream being communicated from first electronic computing device 110. If monitoring device 140 detects that a particular party is speaking, monitoring device 140 may cause information about that particular party to be displayed by second electronic computing device 120. Such functionality may be achieved by using any suitable voice recognition technology, where voice samples may be pre-stored by monitoring device 140 along with or independent from images. Such monitoring and display may be applicable to multiple parties associated with the same device. For example, monitoring device 140 may detect a plurality of parties present at first electronic computing device 110. One or more of the parties at first electronic computing device 110 may speak. Accordingly, monitoring device 140 may then cause information about some or all of the speaking party or parties to be displayed by second electronic computing device 120.

In some embodiments, the information may be displayed only while a party speaks or is present. In other embodiments, the information may be displayed only for a predetermined amount of time after the party begins speaking or becomes present. For example, the information may be displayed for 5 seconds after a party begins to speak. The predetermined amount of time may be any suitable amount, such as 1 second, 5 seconds, 10 seconds, 30 seconds, an amount greater than 30 seconds, an amount in the range of 1 second and 30 seconds, etc.

In some embodiments, a layer of security is added. In such cases, a communication link may be established only if at least one of the party's is authenticated. In some cases, only party may need to be authenticated. In other cases, all party's may need to be authenticated. Where the communication link is established based on a pre-arranged meeting, an identify of the party's to be authenticated may be obtained via stored information concerning the pre-arranged meeting.

The party's may be authenticated in a variety of ways. In one embodiment, each party may be associated with a portable identification device. The portable identification device may store a unique identifier associated with the party to which the portable identification device is issued. The portable identification device may communicate either directly with monitoring device 140 or indirectly with monitoring device 140 via one of the first and second electronic computing devices. The portable identification device may use any suitable communication technology similar to those previously discussed.

In communicating with monitoring device 140, the portable identification device may communicate the unique identifier to monitoring device 140. Monitoring device 140 may then receive and compare the unique identifier to a pre-stored identifier associated with at least one of the party's. If the identifiers match, monitoring device 140 may establish the communication link. If, however, the identifiers do no match, monitoring device 140 may refuse to establish the communication link. In one embodiment, the portable identification device need not communicate with monitoring device 140. Rather, the authentication may be performed at one of the first and second electronic computing devices, where the electronic computing device may subsequently send a confirmation to monitoring device 140 confirming whether or not the party was successfully authenticated.

In another embodiment, each party may perform an authentication at an electronic computing device. The electronic computing device may then send a confirmation to monitoring device 140 confirming whether or not the party was successfully authenticated. The authentication at the electronic computing device may utilize any suitable authentication procedure, such as fingerprint authentication, iris authentication, facial imaging authentication, voice authentication, key-card authentication, password authentication, etc.

In one embodiment, monitoring device 140 may monitor the authentication and disable the communication link if authentication is expired. For example, where authentication is via a portable identification device, and the portable identification device communicates with monitoring device 140 indirectly via one of first and second electronic computing devices, the communication link may be disabled if the portable identification device is moved out of communication range from the electronic computing device.

In one embodiment, an amount of system resources may be selectively allocated for the communication link. The amount of resources allocated for a communication link may be based on one or more attributes of one or more of the parties participating in the communication link.

For example, an importance value may be associated with each of the parties. The importance value may be stored, for example, along with the images by monitoring device 140. Where an importance value indicates that one of the parties involved in a communication link is important, monitoring device 140 may establish a communication link using a maximum number of system resources. On the other hand, where an importance value indicates that some or all of the parties involved in a communication link is not important, monitoring device 140 may establish a communication link using a minimum number of system resources. For example, if one of the parties involved in a communication link is the CEO of a company, a maximum number of system resources may be allocated to the communication link. If, on the other hand, all of the parties involved in the communication link are administrative staff, a minimum number of system resources may be allocated.

For another example, a schedule of availability and system resources may be associated with one or more of the parties. For example, an employee may be associated with a schedule indicating dates and/or times at which the employee may establish communication links and, in some cases, an amount of system resources available for the employee during those times. Such schedules may also be stored by monitoring device 140 and read, for example, when one of the parties is recognized. For yet another example, system resources may be associated with a location of one or more of the parties. For example, a party may be allocated a relatively high amount of system resources when the party is located in a particular room, at a particular company office, etc., and a relatively low amount of system resources when the party is located elsewhere.

In some embodiments, attributes other than those associated with particular parties may be used to allocate system resources. For example, some meetings may have importance indicators based on topic or the like. For example, when a meeting is scheduled, an indicator may be set and stored indicating that the meeting is of high importance. In such a case, a high number of system resources may be allocated to the communication link. For another example, system resources may be allocated based on the type of electronic computing devices used. For example, where first electronic computing device 110 is a mobile telephone, a bandwidth allocated for communicating data from second electronic computing device 120 to first electronic computing device 110 may be relatively small. However, where first electronic computing device 110 is a computer system set up for a telepresence meeting, the bandwidth allocated for communicating data from second electronic computing device 120 to first electronic computing device 110 may be relatively large.

It is to be understood that the examples and embodiments described above are for illustrative purposes only and that various modifications or changes in light thereof will be suggested to persons skilled in the art and are to be included within the spirit and purview of this application and scope of the appended claims. For example, some or all of the method for capturing and processing images/video as discussed with reference to FIG. 3 may be combined with one or more of the methods discussed with reference to FIG. 5 to FIG. 12. For another example, while various communication links are discussed with reference to, e.g., FIG. 13, the communication links may include video signals processed according to one or more of the previously discussed methods, including any of those discussed with reference to FIG. 3 and FIGS. 5 to 12. Therefore, the above description should not be understood as limiting the scope of the invention as defined by the claims.

What is claimed is:

1. A method of initiating a communication between two parties, comprising:
   storing characteristic information of first and second parties each associated with a computing device;
   receiving characteristic information from a computing device;
   comparing the received characteristic information to the stored characteristic information to determine whether the received characteristic information matches the characteristic information of one of the first and second party;
   if the received characteristic information matches the characteristic information of one of the first and second party, establishing a first communication link between the computing device at which the received characteristic information was received and the computing device associated with the party for which the received characteristic information matches;
   receiving images of the first and second parties as part of the first communication link;
   detecting the absence of the first party; and
   in response to detecting the absence of the first party, establishing a second communication link between the computing device associated with the second party and a second computing device associated with the first party.

2. The method of claim 1, wherein the first communication link is established between the computing devices associated with the first and second parties.

3. The method of claim 1, wherein the first communication link includes both a video link and an audio link.

4. The method of claim 1 wherein the second computing device is a mobile computing device.

5. The method of claim 4, wherein the second communication link includes only an audio link.

6. The method of claim 1, further comprising:
   disconnecting the first communication link when the second communication link is established.

7. The method of claim 1, further comprising displaying information about the first party on the computing device associated with the second party.

8. The method of claim 7, further comprising:
   monitoring the first communication link to determine whether the first party speaks or becomes visible to the second party,
   wherein the information is displayed about the first party when it is determined that the first party speaks or becomes visible to the second party.

9. The method of claim 1, wherein the first communication link is established only if an identification confirmation is received from portable security devices associated with each of the first and second parties.

10. The method of claim 1, further comprising:
    selectively allocating an amount of system resources for the first communication link.

11. The method of claim 10, wherein the amount of system resources is allocated based on an importance value associated with at least one of the first and second parties.

12. The method of claim 10, wherein the amount of system resources is allocated based on restrictions associated with at least one of the first and second parties.

13. The method of claim 1, wherein the characteristic information is at least one of an image, a voice sample, a facial feature, and an identification card.

* * * * *